US008707230B1

(12) United States Patent
Hu et al.

(10) Patent No.: US 8,707,230 B1
(45) Date of Patent: Apr. 22, 2014

(54) METHOD AND SYSTEM FOR SEMICONDUCTOR SIMULATION

(71) Applicant: Taiwan Semiconductor Manufacturing Co., Ltd., Hsin-Chu (TW)

(72) Inventors: Wei-Yi Hu, Zhubei (TW); Chin-Cheng Kuo, Taoyuan (TW); Cheng-Hung Yeh, Jhunan Township (TW); Jui-Feng Kuan, Zhubei (TW); Yi-Kan Cheng, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/792,827

(22) Filed: Mar. 11, 2013

(51) Int. Cl.
*G06F 17/50* (2006.01)

(52) U.S. Cl.
USPC ........................................................ 716/110

(58) Field of Classification Search
USPC ........................................................ 716/110
See application file for complete search history.

(56) References Cited

U.S. PATENT DOCUMENTS 8,589,831 B1 * 11/2013 Chang et al. ..................... 716/55
2013/0305196 A1 * 11/2013 Chou et al. ..................... 716/102

OTHER PUBLICATIONS

"Monte Carlo Simulation in HSPICE", Analog Integrated Circuits Design, Fall 2007, pp. 1-4.
Hung, H. et al., "Monte Carlo Simulation of Device Variations and Mismatch in Analog Integrated Circuits", Proceedings of The National Conference on Undergraduate Research (NCUR), Apr. 2006, The University of North Carolina at Asheville, Asheville, North Carolina, 8 pages.

\* cited by examiner

*Primary Examiner* — Suchin Parihar
(74) *Attorney, Agent, or Firm* — Duane Morris LLP; Steven E. Koffs

(57) ABSTRACT

An integrated circuit (IC) simulation method comprises providing a device process model from a non-transitory machine readable storage medium into a programmed computer. The device process model includes one or more device variables. Each device variable defines a probability distribution of an active-device-level variation of devices in an IC. A conductive line model and/or a multi patterning technology (MPT) model is provided from the storage medium to the computer. The conductive line model includes one or more conductive line variables. Each conductive line variable defines a probability distribution of a conductive-line process-induced variation. The MPT model includes one or more MPT variables. Each MPT variable defines a probability distribution of a mask-misalignment-induced conductive line coupling variation. A Monte Carlo simulation is performed in the computer, including the device process model and the conductive line model or MPT model, to identify parasitic couplings in the IC.

20 Claims, 6 Drawing Sheets

METHOD AND SYSTEM FOR SEMICONDUCTOR SIMULATION

FIELD

This disclosure relates generally to semiconductor integrated circuits (IC), and more specifically to electronic design automation (EDA) and simulation tools for IC design.

BACKGROUND

The design process for a new IC includes several steps using automated EDA tools. During initial schematic design, the designer identifies a set of functions to include in the design, along with their standard delays. The designer uses computer implemented tools to perform functional simulation, to ensure that the design performs its intended function(s). Before the schematic design is laid out, the designer performs a pre-simulation. The pre-simulation takes into account device and cell characteristics, to provide an estimate of circuit performance (i.e., performance in both analog and digital designs, including timing performance in digital designs). If the design meets circuit performance requirements in the pre-simulation, the designer initiates the floorplan and layout phases, to generate the actual IC layout, using the place and route engine of the EDA tool. If the pre-simulation identifies significant performance issues, the designer modifies the design before proceeding to layout.

Following the layout process, the user verifies the design by using the EDA tools to perform design rule checks (DRC), layout versus schematic (LVS) checks, and RC extraction. The RC extraction tool takes into account the layout of the conductive (e.g., metal) lines of the interconnect layers generated by the router and computes parasitic resistance and capacitance elements associated with each conductive line. Then a post-simulation verifies circuit performance, taking into account the parasitic resistance and capacitance elements, in addition to the device and cell characteristics.

With the advent of advanced technology nodes having geometries of 40 nanometers and smaller, the delays associated with the interconnect conductive lines become more significant, and will surpass the device and cell characteristics as the bottleneck in IC design.

DETAILED DESCRIPTION

Figure 1:
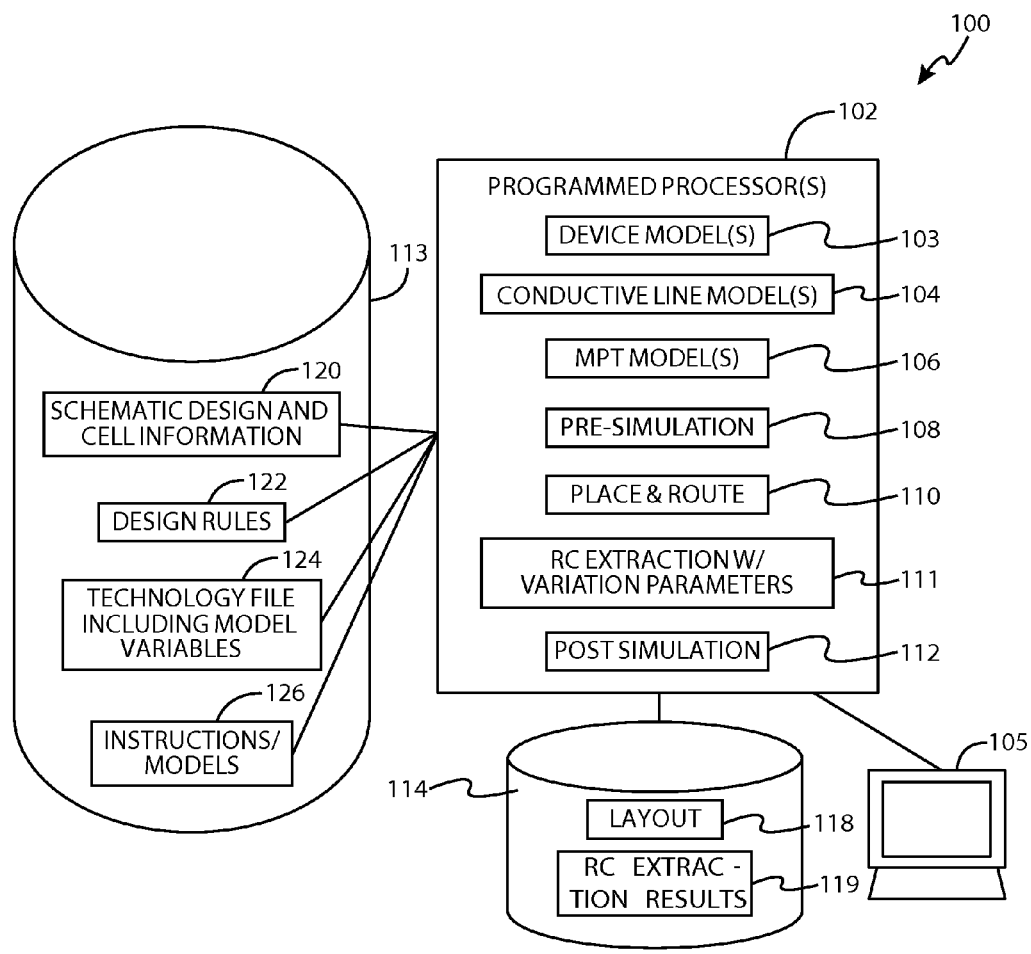
FIG. 1 is a block diagram of a system according to some embodiments.

This description of the exemplary embodiments is intended to be read in connection with the accompanying drawings, which are to be considered part of the entire written description.

As the parasitic RC delays of interconnect conductive lines grow in importance relative to active device delays, the variation in the parasitic delays also becomes more important. Thus, the inventors have determined a simulation method and automated computer implemented system taking these variations in interconnect delays into account for verification simulation and RC extraction purposes. For example, in some embodiments, the simulation method and system account for variations caused by device process, variations caused by the metal process, and variations caused by multiple patterning (e.g., double patterning) technology. This method can be extended to also include other sources of variation, (e.g., layout dependent effects). In some embodiments, the designer is presented with selection options to include the conductive line model and/or the MPT model in the simulation. This method can be used both digital and analog design flows.

By including all of the variation sources in the same Monte Carlo (MC) simulation, more realistic corner scenarios are addressed, because the independent sources of variation do not inappropriately reach their worst case conditions simultaneously in actual operation. Further, it is inappropriate to run a separate simulation for each source of variation.

In some embodiments, the combined Monte Carlo simulation is performed for circuit-critical nets selected by the designer. In other embodiments, the combined Monte Carlo simulation is performed for all nets except non-circuit critical nets selected by the designer. In other embodiments, the combined Monte Carlo simulation is performed for all nets.

In some embodiments, the combined Monte Carlo simulation is incorporated into pre-layout simulation. In some embodiments, the combined Monte Carlo simulation is incorporated into post-layout simulation. In some embodiments, the designer is presented with a selection screen to select which stages of verification the MC simulation is included in.

Unless expressly stated otherwise, as used herein, the term "metal process" refers to the process of forming conductive interconnect lines and/or vias, regardless of whether the lines comprise a metal (such as copper) or another conductive material (such as polycrystalline silicon). Similarly, the term "metal model" refers to a model of the interconnect conductive lines, regardless of whether formed of metal or other conductive material; and the term "metal layer" refers to one of the interconnect layers, regardless of whether the layer comprises metal or other conductive material therein.

As used herein, the term multiple patterning technology (MPT) refers broadly to multiple exposure methods using two or more photomasks to pattern the same layer of a semiconductor substrate. Thus, as used herein, double patterning technology (DPT) is one example of MPT. MPT also encompasses triple patterning technology (TPT), quadruple patterning technology or the like. References to MPT below refer to the more general case, and references to DPT pertain to a class of examples. Reference to a DPT example is not intended to be limiting, and such examples can be extended to other forms of MPT.

The methods described herein consider multiple sources of variation in a co-simulation. In some embodiments, the variability of each line within each individual layer is considered independently. In some embodiments, the variability of DPT mask misalignment in each interconnect layer is considered independently. The variability of device-level variations and metal layer variations are considered independently, and the variability of each metal layer can be considered independently. Because the statistical variations are considered, it is not appropriate to assume that the worst case (corner) conditions for every parameter occur simultaneously. Thus, the method allows the designer to avoid overdesigning the IC, allowing a smaller IC that meets circuit specifications.

Figure 3:
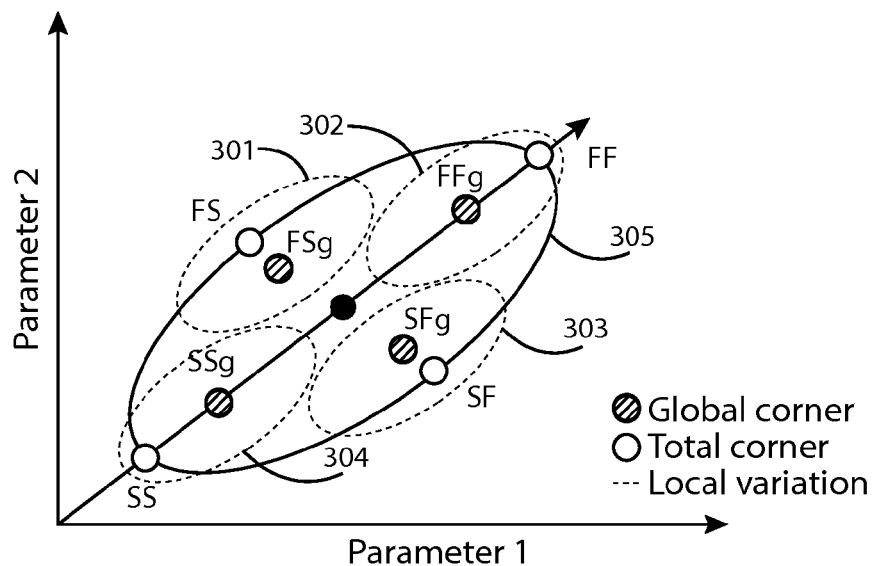
FIG. 3 schematically shows corner conditions in the device model of FIG. 1.
Figure 4:
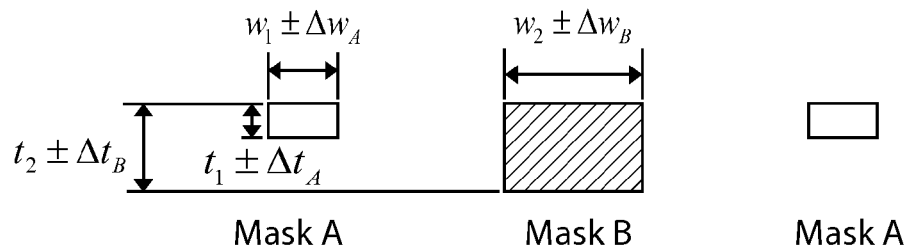
FIG. 4 schematically shows parameters of the conductive line model of FIG. 1.
Figure 5:
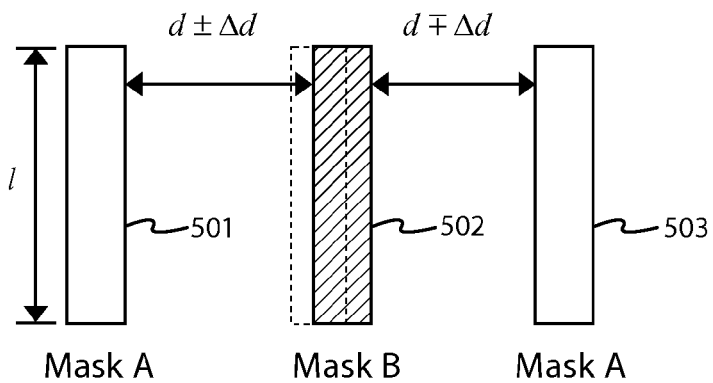
FIG. 5 schematically shows mask misalignment in the MPT model of FIG. 1.

FIGS. 3-5 show examples of the variation types the model takes into account.

FIG. 3 is a diagram showing local and global process variation spaces. FIG. 3 schematically shows that the four parameters 301-304 each have a relatively small local variation space (indicated by the small ellipses), but the total variation space 305 defined by the corners of each individual parameter is much larger. Thus, device process variation parameters include corners as well as local mismatch.

FIG. 4 shows the conductive line variation parameters $\Delta W$ and $\Delta t$ for variations in line width and thickness, respectively. A third metal process variation parameter $\Delta L$ corresponds to length variation, in the direction pointing into the page, orthogonal to the directions of $\Delta W$ and $\Delta t$.

FIG. 5 schematically shows MPT (e.g., DPT) variation. With correct alignment, the center line segment 502 is separated from the left 501 and right 503 segments by the distance d. In the case of a mask misalignment of $\Delta d$, one of the spacings is reduced to $d-\Delta d$, and the other one of the spacings is increased to $d+\Delta d$. This increases the parasitic capacitive coupling between the center line 502 and one of the left and right lines 501, 503, and decreases the parasitic capacitive coupling between the center line 502 and the other of the left and right lines 503, 501. FIG. 5 shows the result of horizontal misalignment of the masks. A similar DPT variation source is vertical misalignment between masks. Thus there are two DPT variation variables: $\Delta dx$ and $\Delta dy$, corresponding to the X-axis metal shift and Y-axis metal shift between a photomask and a pattern previously formed on a substrate.

Figure 6:
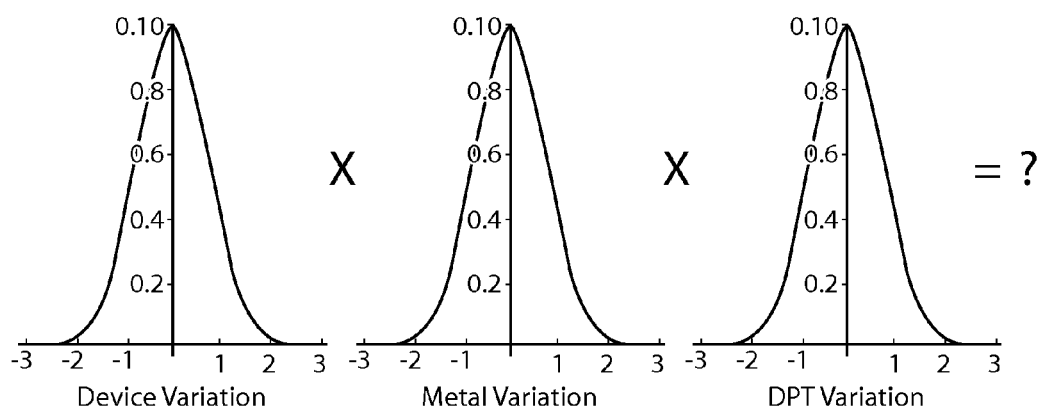
FIG. 6 schematically shows the independence of the variation sources, including device level variation, metal level variation, and DPT variation.

FIG. 6 schematically shows that each one of the device process variation, metal process variation and DPT misalignment variation has a respective probability distribution, independent of the other sources of variation.

FIG. 1 is a block diagram of an example of a system for co-simulating the device level variations, metal-level variations, and MPT variations.

System 100 includes at least one non-transitory, computer readable storage medium 113 for storing data representing a schematic design of a layer of an integrated circuit (IC) comprising a plurality of standard library cells for inclusion in a semiconductor substrate. Either the same storage medium 113 or a different storage medium (not shown) stores data and instructions used by the EDA tool 102. These include, but are not limited to schematic design and cell information 120, design rules 122, technology file 124 including model variables (described below), and software program instructions 126.

System 100 includes an electronic design automation ("EDA") tool 102 such as "IC COMPILER"™, sold by Synopsys, Inc. of Mountain View, Calif., which may include a place and route tool 110, such as "ZROUTE"™, also sold by Synopsys. Other EDA tools 102 may be used, such as the "VIRTUOSO" custom design platform or the Cadence "ENCOUNTER"® digital IC design platform may be used, along with the "VIRTUOSO" chip assembly router 804, all sold by Cadence Design Systems, Inc. of San Jose, Calif.

EDA tool 102 is a special purpose computer formed by retrieving stored program instructions 126 from a non-transitory computer readable storage medium 113 and executing the instructions on a general purpose processor. Examples of non-transient computer readable storage mediums 113 include, but are not limited to, hard disk drives (HDD), read only memories ("ROMs"), random access memories ("RAMs"), flash memories, or the like. Tangible, non-transient machine readable storage mediums 113, 114 are configured to store data generated by the place and route tool 110.

In some embodiments, the simulation takes into account a device process model 103 including one or more device variables. The device model 103 uses a Monte Carlo simulation to account for random mismatch between different instances of the same component due to process variation. For example, process variations may change the parameters of MOSFETs, BJTs and resistors. The method provides a device process model for each of these components. The models include the distribution of parameters which can significantly affect the electrical characteristics of each component. For example, relevant parameters for a MOSFET can include $\Delta W$ (width variation), $\Delta L$ (length variation), $\Delta tox$ (gate insulation layer thickness variation), $\Delta Vth$ (threshold voltage variation), or the like. Each device variable defines a probability distribution of an active-device-level variation of devices in an IC. In some embodiments, the variations of each parameter are modeled as having a Gaussian distribution characterized by a mean $\mu$ and standard deviation $\sigma$. In some embodiments, the device model 103 also takes into account five device corner conditions. In some embodiments, the device level model also takes layout dependent effects into consideration during the Monte Carlo simulation.

In some embodiments, the simulation takes into account a conductive line process model 104 including one or more conductive line variables. The conductive line model 104 uses a Monte Carlo simulation to account for random mismatch between different instances of interconnect conductive lines due to process variation. For example, process variations may change the parameters of length L, width W and thickness t. The models include the distribution of length L, width W and thickness t. Each device variable defines a probability distribution of an active-device-level variation of devices in the IC. In some embodiments, the variations of each parameter L, W and t are modeled as having a Gaussian distribution characterized by a mean $\mu$ and standard deviation $\sigma$. In some embodiments, the parameters L, W and t are assumed to vary independently of each other. By using the three variation parameters L, W, and t, the method reduces the number of parameters from a pure corner-oriented approach, which can use as many as eleven corner conditions for conductive line layer variations. Further, the number of technology files 124 can be reduced to one (compared to a larger number of corner technology files in a pure corner-oriented approach).

The conductive line model 104 uses 1 BEOL metal model file (or includes the metal model parameters within another file). The variation parameters can be defined inside the RC extraction view/netlist. Individual variation parameters can be defined for each respective metal layer. In some embodiments, RC extraction is only performed for a typical corner, with the variation parameters embedded in one technology file 124. In some embodiments, the Monte Carlo simulation can be run once after RC extraction, taking into account the device level mode, the metal model variations and the MPT model variations.

In some embodiments, the IC is to be fabricated using an MPT method, such as DPT. In some embodiments, the simulation uses a MPT (e.g., DPT) model 106 including one or more misalignment variables. The MPT model 106 uses a Monte Carlo simulation to account for random misalignment of masks used to pattern the same layer of the IC. Although the misalignment within a single layer is constant, the misalignment in each layer can vary independently of the other layers. In some embodiments, misalignments in each respective layer are modeled as being independent of each other, and distributed according to a probability distribution (e.g., a Gaussian distribution with mean μ and standard deviation σ). Although the misalignment of each layer is independent of the other layers, the misalignment of all of the layers can be characterized by the same probability distribution.

The place and route tool 110 is capable of receiving an identification of a plurality of cells to be included in an integrated circuit ("IC") or interposer layout, including a netlist containing pairs of cells within the plurality of cells to be connected to each other. The netlist includes parameters defining a respective probability distribution of each conductive line variable or MPT variable. For example, in some embodiments, an entry in the netlist specifies a pair of pins to be connected to each other, and identification of a device/line type identified in the technology file 12 (where the technology file further includes the mean and standard deviation for each metal model variation variable and for each MPT model variation variable). Place and route tool 110 can be equipped with a set of default design rules 122 and tech file 124. Place and route tool 110 generates the custom interconnect routing lines and vias for interconnecting the pins of the various standard cells of the IC. In some embodiments, for an analog design, place and route can be done manually The technology file 124 includes parameter variation information for each type of line or device, at the particular technology node. In some embodiments, the parameter variation information identifies the most important parameters which are to be modeled in a conductive line Monte Carlo model 104 used by the RC extraction module 111. For each type of line or device to be modeled by conductive line Monte Carlo simulation, the technology file 124 includes a corresponding set of model parameters. In some embodiments, the technology file 124 further includes additional parameter variation information defining MPT variation parameters which are to be modeled in an MPT Monte Carlo model 106 used by the RC extraction module 111.

For example, in some embodiments, given a line having nominal length L, width W and thickness t, the conductive line model 104 determines variations $\Delta L$, $\Delta W$ and $\Delta t$, by inputting a respective pseudo-random number to the respective probability distributions for these parameters, to generate the parameters $L+\Delta L$, $W+\Delta W$ and $t+\Delta t$ to be used by RC extraction for that line. In some embodiments, for each parasitic resistance/capacitance to be calculated, a respective Monte Carlo trial is run for each variable. That is, $\Delta L$, $\Delta W$ and $\Delta t$ are assumed to be independent of each other.

In other embodiments, $\Delta L$, $\Delta W$ and $\Delta t$ are assumed to vary only slowly over relatively larger distances within the IC, so that $\Delta L$, $\Delta W$ and $\Delta t$ can each be considered constant within a relatively small region of the substrate. RC extraction module 111 uses the conductive line model 104 to generate respective values of $\Delta L$, $\Delta W$ and $\Delta t$ for each respective small region of the IC substrate. Thus, the same $\Delta L$, $\Delta W$ and $\Delta t$ are used for computing resistance/capacitance for any of the lines within a given small region, but different values are used in each respective region. This allows the user to reduce computation time by selecting a slightly larger region size.

In other embodiments, the user specifies a number of Monte Carlo trials to be run for each variable, and after the specified number of values are generated for $\Delta L$, $\Delta W$ and $\Delta t$, an average of generated values is computed for each respective parameter.

In some embodiments MPT is not used, and the RC extraction uses a combination of the device level model 103 and the conductive line model 104 to simulate the variation in parasitic resistance/capacitance.

In other embodiments, MPT (e.g., DPT) is to be used, and the MPT variation model 106 (e.g., DPT model) is added. For example, in some embodiments, a Monte Carlo technique is also used to model DPT misalignment effects. Thus, each layer can have respective DPT mask misalignments $\Delta dx$ and $\Delta dy$ in the X and Y directions, respectively. The variation parameters $\Delta dx$ and $\Delta dy$ are distributed according to a probability distribution (e.g., a Gaussian distribution with mean μ and standard deviation σ). For each layer of the interconnect structure, a pseudo random number is input to the probability distribution function to generate respective values of $\Delta dx$ and $\Delta dy$. The RC translation thus simulates the misalignment in each layer as being independent of the misalignment in other layers, and computes the parasitic resistances and capacitances by taking each layer's misalignment into account.

EDA tool 102 includes a pre-simulation tool 108 which accepts as input a netlist (e.g., Circuit schematic, and connections among them) which has been verified at the schematic design phase). The pre-simulation tool 108 performs an electrical characteristic simulation, taking into account device, cell, and circuit performances, prior to performing place and route. In EDA system 102, the pre-simulation tool 108 provides the user an input mechanism to input metal symbols (discrete representations of the parasitic resistance and capacitance) connecting any desired pair of nodes in the netlist.

For example, the user can identify critical nets (such as a signal path), to be included in the pre-simulation. This allows early identification of performance problems in critical nets before place-and-route, taking into account the interconnect conductive lines, as well as the device, cell, and circuit performances. The user can input a set of mean parameter values for each critical net line, and the pre-simulation tool performs one or more Monte Carlo trials to generate a respective set of variations for each of the parameters, for each of these critical paths. In some embodiments, for every line in the critical nets, the pre-simulation includes a pre-determined number (e.g., 30, 100, 1000 or more) of independent Monte Carlo trials. For each of the predetermined number of trials, respective parameter values for the conductive line model 104 and the MPT model 106 are generated, and the device and line delays are computed for each independent trial. In other embodiments, the user can decide to place all of the interconnect lines for a given critical net in the same mask as each other, to avoid DPT misalignment RC variations within that net, and the pre-simulation for such a net accounts for the device level process variations and metal level (conductive line level) process variations.

The RC extraction module 111 of the EDA tool applies the technology specific parameters of the technology file 124 to the layout, to identify the parasitic resistance and capacitance of each of the interconnect lines. When determining a parasitic resistance/capacitance of a given line or device, the RC extraction module 111 initiates execution of a plurality of Monte Carlo trials, in which the pertinent parameters for that line or device are varied according to the probability distribution information identified in the technology file 124. The RC extraction tool 111 of EDA tool 102 is capable of using the device level Monte Carlo model(s) 103, and either or both of the conductive line model(s) 104 and/or the MPT model 106 for computing a parasitic resistance and capacitance of each device/line in the layout.

EDA tool 102 includes a post-layout simulation (post-sim) tool 112 which accepts as input a netlist including the cells and detailed layout. The post-simulation tool 112 performs an electrical characteristic simulation, taking into account device, cell, circuit, and interconnect line performances. The post-sim results will generally be more accurate than the pre-sim results. In some embodiments, the post-simulation 112 generates a plurality of Monte Carlo trials for each of the devices/lines, to include the device level variations, and either or both of the conductive line model variations and the MPT model variations.

A non-transitory machine readable storage medium 114 receives the outputs of the EDA tool 102, including the layout information (e.g., netlists) 118 and the RC extraction and simulation results 119.

The EDA tool also includes one or more input/output (I/O) devices 105, such as a display, keyboard, pointing device, touch screen, or the like. The EDA tool 102 prompts the user for inputs using the I/O devices 105, and the user inputs requested information and controls the operation of the EDA tool using the I/O devices.

Block 102 indicates that one or more programmed processors may be included. In some embodiments, the processing load is performed by two or more application programs, each operating on a separate processor. In other embodiments, the processes are all performed using one processor. Similarly, two media 113, 114 are shown, but the data may be stored in any number of media.

Although FIG. 1 shows an allocation of the various tasks to specific modules, this is only one example. The various tasks may be assigned to different modules to improve performance, or improve the ease of programming.

Figure 2:
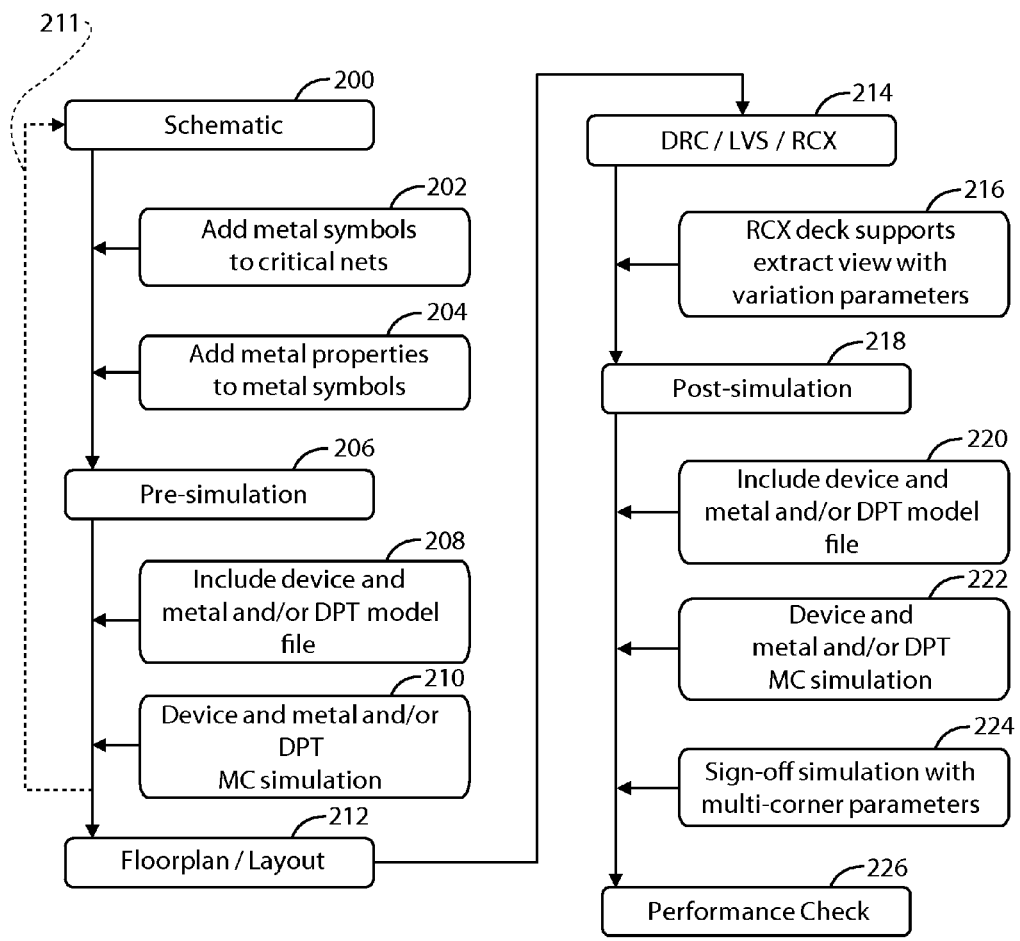
FIG. 2 is a flow chart of a method of using the system of FIG. 1.

FIG. 2 is a flow chart of a method according to some embodiments.

At step 200, a schematic design of an IC is input to the EDA tool. For example, the design can be specified by a schematic netlist.

At step 202, the user adds metal symbols to critical nets. The metal symbols are discrete lumped representations of the parasitic resistance and capacitance of each device/line in the critical nets. The I/O device 105 displays a lumped device representing the parasitic resistance/capacitance on the schematic diagram of the critical nets.

At step 204, the user adds metal properties to the metal symbols of step 202. In some embodiments, the user inputs general properties for each type of element, such as mean resistance or capacitance and standard deviation. In some embodiments, the user also inputs initial estimated resistance and capacitance for the devices/lines.

At step 206, the user initiates the pre-simulation. In the execution of step 206, steps 208 and 210 are performed. The Monte Carlo simulation of the IC is performed in the EDA tool 102, including the device process model and at least one of the conductive line model 104 and the MPT model 106, to identify parasitic couplings in the IC. This step includes performing a respective separate plurality of Monte Carlo trials for each conductive line layer of the IC.

At step 208, device and metal (conductive line) model variation parameters are included in the pre-simulation. The IC has a plurality of conductive line layers, and step 208 includes performing a respective separate plurality of Monte Carlo trials for each conductive line layer of the IC using the same respective probability distribution function for each conductive line variable or MPT variable in each of the plurality of conductive line layers. The device process model 103 includes instructions and data input from a non-transitory machine readable storage medium 113 into the programmed computer acting as the EDA tool 102. The device process model 103 includes one or more device variables from technology file 124. Each device variable defines a probability distribution of an active-device-level variation of devices in an IC. In some embodiments, the substrate is to be patterned using DPT, and so DPT model variation parameters are also included. At least one of the group consisting of a conductive line model 104 and a multi patterning technology (MPT) model 106 are input from the storage medium 113 to the computer 102. The conductive line model 104 includes one or more conductive line variables. Each conductive line variable defines a probability distribution of a conductive-line process-induced variation in the IC. The MPT model includes one or more MPT variables. Each MPT variable defines a probability distribution of a mask-misalignment-induced conductive line coupling variation in the IC.

At step 210, the performance of the pre-simulation includes device and metal and/or DPT Monte Carlo simulation for the user-identified nets from steps 202 and 204. If a performance problem is identified at this stage, then at step 211, the schematic design is modified, and steps 200-210 are repeated until the design meets performance specifications during the pre-simulation.

At step 212, the place and route tool is used for designing the floor plan of the IC design, and for routing the interconnect lines and vias that connect the cells of the design.

At step 214, verification is performed, including design rule checks (DRC), layout versus schematic (LVS) checks and RC extraction. In some embodiments, the probability distribution of the conductive-line process-induced variation and the probability distribution of the mask-misalignment-induced conductive line coupling variation are provided to the RC extraction module of the RC extraction technology file 124, and the Monte Carlo simulation is performed as part of the RC extraction flow for designing the IC. The RC extraction includes step 216 of providing an extraction view with the variation variables. Thus, step 216 allows the user to select any individual net of interest, and view the results of the RC extraction, which include the automatically generated metal model variation values and DPT model variation values.

At step 218, the post-simulation is performed. Step 218 includes steps 220, 222 and 224.

At step 220, the device and metal model and/or DPT model file inputs from technology file 124 are included in the post-simulation.

At step 222, the computation of each RC delay includes performance of a plurality of Monte Carlo trials based on the type of device/line for which the RC delay is computed.

Note that in each of steps 210, 216 and 222, separate pseudo-random values are used to generate variation values for the device model 103, metal model 104 and DPT (MPT) model 106. Thus, these sources of variation are treated as independent of each other, and the worst case device level process variation does not inappropriately coincide with the worst case metal process variation and/or the worst case DPT (MPT) misalignment. As a result, the simulation results are expected to be less pessimistic than a pure corner analysis, reducing overdesign of the IC.

At step 224, the user can sign-off the simulation with multiple corner parameters. Because the device, metal and DPT models are co-simulated, the simulation corner results are more statistically meaningful than designing to a worst/worst/worst case scenario, in which the worst case device variation, worst case metal process variation and worst case DPT misalignment are all assumed to coincide.

An example of an RC model used to define the metal process variation and DPT misalignment variation is described below.

The capacitive coupling C between two lines is given by $$C = \varepsilon \frac{A}{d},$$

where $\varepsilon$ is the dielectric constant, A is the area of the side edges which face each other, given by l×t, where l is the length and t is the thickness.

The resistance R of a line segment is given by $$R = \rho \frac{l}{A},$$

where $\rho$ is the resistivity, l is the length and A is the cross-sectional area.

Figure 8:
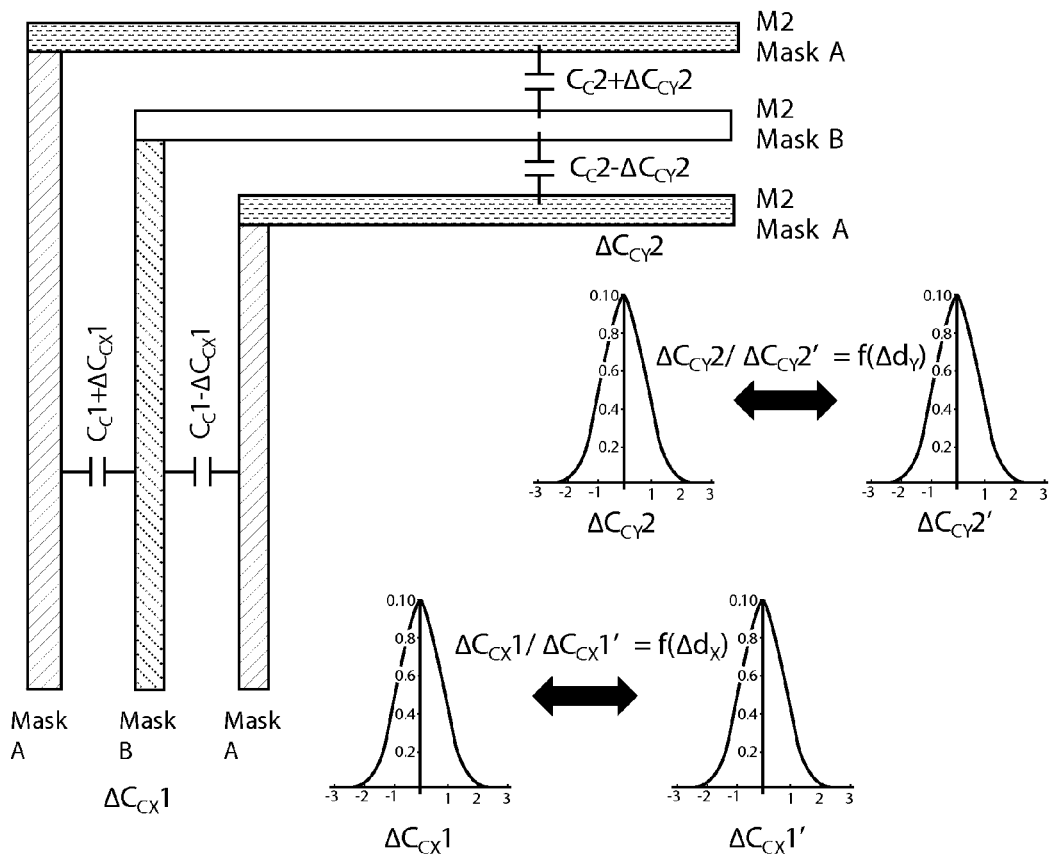
FIG. 8 shows parameters of an example of a DPT model.

FIG. 8 is a diagram showing parameters of an example of a back-end-of-line (BEOL) Monte Carlo (MC) simulation.

In FIG. 8, a five-corner metal model is used In some embodiments, the five corner conditions include: Typical, RC-Best, RC-worst, C-best, C-worst. In addition, the simulation includes a critical dimension (CD) biasing BEOL metal MC model (conductive line model 104), and an X-Y shift DPT model 106. The variation parameters are embedded in the BEOL metal model and DPT model for running MC trials in the simulation phase. These parameters are defined in the technology file 124. The DPT model supports multi-layer MC trials, with only two variables per metal layer: $\Delta C_{CX}$ and $\Delta_{CY}$.

In FIG. 8, the following definitions apply:

$\Delta C_{CX}1$: X-direction variation of metal layer 1, positive side of delta-coupling $\Delta C_{CX}1'$: X-direction variation of metal layer 1, negative side of delta-coupling $\Delta C_{CY}1$: Y-direction variation of metal layer 1, positive side of delta-coupling $\Delta C_{CY}1'$: Y-direction variation of metal layer 1, negative side of delta-coupling $\Delta C_{CX}2$: X-direction variation of metal layer 2, positive side of delta-coupling $\Delta C_{CX}2'$: X-direction variation of metal layer 2, negative side of delta-coupling $\Delta C_{CY}2$: Y-direction variation of metal layer 2, positive side of delta-coupling $\Delta C_{CY}2'$: Y-direction variation of metal layer 1, negative side of delta-coupling The total parasitic capacitance is given by $$C_{Total} = C_C + C_{Gnd},$$

where $C_C$ is the coupling between adjacent lines, where $C_C = f(t,l,d)$, and $C_{Gnd}$ is the coupling to the ground (bulk semiconductor), where $C_{Gnd} = f(w,l,d)$.

The capacitive coupling between two adjacent lines is given by $$C_C = \frac{\varepsilon[\min(t_1, t_2) \cdot l]}{d},$$

where the lines patterned by one mask have thickness $t_1$, the lines patterned by the other mask have thickness $t_2$, and the nominal distance between lines is d. The variations due to mask misalignment in the X direction are given by:

$$C_{CX} + \Delta C_{CX} = \frac{\varepsilon[\min(t_1, t_2) \cdot l]}{d_X - \Delta d_X}, \text{ and}$$

$$C_{CX} - \Delta C'_{CX} = \frac{\varepsilon[\min(t_1, t_2) \cdot l]}{d_X + \Delta d_X}$$

Thus, the change in parasitic capacitive coupling for the X and Y directions can be computed as:

$$\Delta C_{CX} = \frac{\varepsilon[\min(t_1, t_2) \cdot l]}{d_X - \Delta d_X} - C_{CX}$$

$$= \varepsilon[\min(t_1, t_2) \cdot l] \frac{\Delta d_X}{d_X(d_X - \Delta d_X)},$$

$$\Delta C'_{CX} = C_{CX} - \frac{\varepsilon[\min(t_1, t_2) \cdot l]}{d_X + \Delta d_X}$$

$$= \varepsilon[\min(t_1, t_2) \cdot l] \frac{\Delta d_X}{d_X(d_X + \Delta d_X)}$$

and, $$\Delta C_{CY} = \frac{\varepsilon[\min(t_1, t_2) \cdot l]}{d_Y - \Delta d_Y} - C_{CY}$$

$$= \varepsilon[\min(t_1, t_2) \cdot l] \frac{\Delta d_Y}{d_Y(d_Y - \Delta d_Y)},$$

$$\Delta C'_{CY} = C_{CY} - \frac{\varepsilon[\min(t_1, t_2) \cdot l]}{d_Y + \Delta d_Y}$$

$$= \varepsilon[\min(t_1, t_2) \cdot l] \frac{\Delta d_Y}{d_Y(d_Y + \Delta d_Y)}$$

Figure 7:
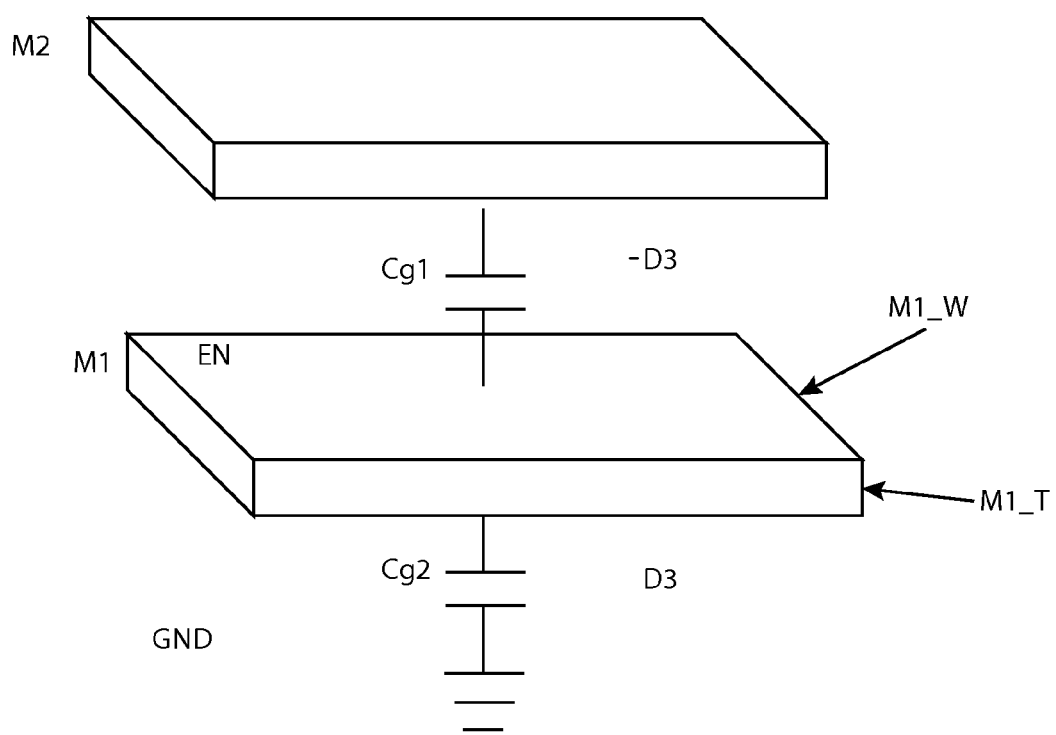
FIG. 7 shows the parameters of an example of a conductive line model.

While $\dfrac{\Delta C_{CX}}{\Delta C'_{CX}} = \dfrac{d_X + \Delta d_X}{d_X - \Delta d_X}$, and $\dfrac{\Delta C_{CY}}{\Delta C'_{CY}} = \dfrac{d_Y + \Delta d_Y}{d_Y - \Delta d_Y}$ An example of definition of variation parameters for a set of patterns shown in FIG. 7 (corresponding to the metal 1 layer M1 and Metal 2 layer M2) can be included in the technology file follows:

First, the variation variables are defined: For example,

| | |
|---|---|
| .SUBCKT M1M2 | // Design name |
| *VARIATION_PARAMETERS | // Layers are provided by extraction tool |
| MC0 M1_T | // M1 thickness |
| MC1 M1_W | // M1 width |
| MC2 M2_T | // M2 thickness |
| MC3 M2_W | // M2 width |
| MC4 D0 | // Distance in bottom side |

The variation variables for this example are embedded in the netlist after RC extraction via the extraction technology file as follows.

*|NET EN 0.284562*MC M1_T M1_W M2_T M2_W D0
Cg1 M1:0 M2:0 0.184000*MC M1_T M1_W M2_T M2_W-D0
Cg2 M1:0 0 0.100562*MC M1_T M1_W M2_T M2_W D3

The methods and systems of this disclosure provide metal variations in circuit design. The variability of each conductive line layer is simulated independently of other layers. The variability of device level variations and conductive line level variations are also independent of each other. The metal model can be used to verify metal variation with multiple metal layer variations and provide co-simulation with the device model. This method can provide a more accurate and efficient design methodology in variation verification. This method can simplify simulation procedure in variation verification, without the need to consider more and more corner conditions. This method can be used as a reference for specification sign-off, with less overdesign error. By reducing overdesign, the method reduces the gap between post-layout simulation and silicon data. The method is applicable to advanced processes, such as, but not limited to, 20 nanometer, FinFET and others.

In some embodiments, an integrated circuit (IC) simulation method comprises providing a device process model from a non-transitory machine readable storage medium into a programmed computer. The device process model includes one or more device variables. Each device variable defines a probability distribution of an active-device-level variation of devices in an IC. At least one of the group consisting of a conductive line model and a multi patterning technology (MPT) model is provided from the storage medium to the computer. The conductive line model includes one or more conductive line variables. Each conductive line variable defines a probability distribution of a conductive-line process-induced variation in the IC. The MPT model includes one or more MPT variables. Each MPT variable defines a probability distribution of a mask-misalignment-induced conductive line coupling variation in the IC. A Monte Carlo simulation of the IC is performed in the computer, including the device process model and the at least one of the conductive line model and the MPT model, to identify parasitic couplings in the IC.

In some embodiments, a computer implemented system comprises a non-transitory machine readable storage medium encoded with data representing a device process model including one or more device variables. Each device variable defines a probability distribution of an active-device-level variation of devices in an IC. The conductive line model includes one or more conductive line variables. Each conductive line variable defines a probability distribution of a conductive-line process-induced variation in the IC. The medium is also encoded with at least one of the group consisting of a conductive line model and a multi patterning technology (MPT) model. The MPT model includes one or more MPT variables. Each MPT variable defines a probability distribution of a mask-misalignment-induced conductive line coupling variation in the IC. A computer processor is programmed to execute a Monte Carlo simulation of the IC including the device process model and the at least one of the conductive line model and the MPT model, to identify parasitic couplings in the IC.

In some embodiments, a non-transitory machine readable storage medium encoded with computer program code, such that when a computer processor executes the computer program code, the processor performs an integrated circuit (IC) simulation method, comprising providing a device process model from a non-transitory machine readable storage medium into a programmed computer. The device process model includes one or more device variables. Each device variable defines a probability distribution of an active-device-level variation of devices in an IC. At least one of the group consisting of a conductive line model and a multi patterning technology (MPT) model is provided from the storage medium to the computer. The conductive line model includes one or more conductive line variables. Each conductive line variable defines a probability distribution of a conductive-line process-induced variation in the IC. The MPT model includes one or more MPT variables. Each MPT variable defines a probability distribution of a mask-misalignment-induced conductive line coupling variation in the IC. A Monte Carlo simulation of the IC is performed in the computer, including the device process model and the at least one of the conductive line model and the MPT model, to identify parasitic couplings in the IC.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. An integrated circuit (IC) simulation method, comprising
    (a) providing a device process model from at least one non-transitory machine readable storage medium into a programmed computer, the device process model including one or more device variables, each device variable defining a probability distribution of an active-device-level variation of devices in an IC;
    (b) providing at least one of the group consisting of a conductive line model and a multi patterning technology (MPT) model from the storage medium to the computer, the conductive line model including one or more conductive line variables, each conductive line variable defining a probability distribution of a conductive-line process-induced variation in the IC, the MPT model including one or more MPT variables, each MPT variable defining a probability distribution of a mask-misalignment-induced conductive line coupling variation in the IC; and
    (c) performing in the computer a Monte Carlo simulation of the IC including the device process model and the at least one of the group consisting of the conductive line model and the MPT model, to identify parasitic couplings in the IC.

2. The IC simulation method of claim 1, wherein the conductive line variables include at least one of the group consisting of line thickness deviation, line width deviation and line height deviation.

3. The IC simulation method of claim 1, wherein the conductive line variables include line thickness deviation, line width deviation and line height deviation.

4. The IC simulation method of claim 1, wherein the MPT variables include at least one of the group consisting of X-axis metal shift and Y-axis metal shift between a photomask and a pattern previously formed on a substrate.

5. The IC simulation method of claim 1, wherein the MPT variables include X-axis metal shift and Y-axis metal shift.

6. The IC simulation method of claim 1, wherein the device variables include at least one of the group consisting of process corners and device mismatch.

7. The IC simulation method of claim 1, wherein the IC has a plurality of conductive line layers, and step (c) includes performing a respective separate plurality of Monte Carlo trials for each conductive line layer of the IC.

8. The IC simulation method of claim 1, wherein step (b) comprises inputting a netlist including parameters defining a respective probability distribution of each conductive line variable or MPT variable.

9. The IC simulation of claim 8, wherein the IC has a plurality of conductive line layers, and the step of performing the Monte Carlo simulation includes performing a respective separate plurality of Monte Carlo trials for each conductive line layer of the IC using the same respective probability distribution function for each conductive line variable or MPT variable in each of the plurality of conductive line layers.

10. The IC simulation method of claim 1, wherein the Monte Carlo simulation is included in a pre-layout simulation performed before laying out the IC, as part of a design flow for designing the IC, and the method further comprises:
(i) providing a design of the IC at a schematic level;
(ii) inserting discrete representations of at least one network of conductive lines into the schematic level design,
(iii) wherein the pre-layout simulation, including the Monte Carlo simulation, is performed after inserting the representations of the at least one network of conductive lines.

11. The IC simulation method of claim 10, further comprising modifying the schematic design before laying out the IC, if the pre-layout simulation identifies a timing problem.

12. The IC simulation method of claim 1, wherein:
the method further comprises providing the probability distribution of the conductive-line process-induced variation and the probability distribution of the mask-misalignment-induced conductive line coupling variation to an RC extraction module of an electronic design automation tool as part of an RC extraction technology file, and
the Monte Carlo simulation is performed as part of the RC verification flow for designing the IC.

13. The IC simulation method of claim 1, wherein the simulation is a post-layout simulation.

14. The IC simulation method of claim 1, wherein:
the Monte Carlo simulation is included in a pre-layout simulation performed before laying out the IC, as part of a design flow for designing the IC, and the method further comprises:
(i) providing a design of the IC at a schematic level;
(ii) inserting discrete representations of at least one network of conductive lines into the schematic level design,
wherein the pre-layout simulation, including the Monte Carlo simulation, is performed after inserting the representations of the at least one network of conductive lines;
and the method further comprises:
providing the probability distribution of the conductive-line process-induced variation and the probability distribution of the mask-misalignment-induced conductive line coupling variation to an RC extraction module of an electronic design automation tool as part of an RC extraction technology file,
wherein a second Monte Carlo simulation including the device process model and the at least one of the conductive line model and the MPT model is performed as part of a post-layout simulation, after RC extraction.

15. A computer implemented system, comprising:
a non-transitory machine readable storage medium, encoded with data representing:
a device process model including one or more device variables, each device variable defining a probability distribution of an active-device-level variation of devices in an IC, and
at least one of the group consisting of a conductive line model and a multi patterning technology (MPT) model, the conductive line model including one or more conductive line variables, each conductive line variable defining a probability distribution of a conductive-line process-induced variation in the IC, the MPT model including one or more MPT variables, each MPT variable defining a probability distribution of a mask-misalignment-induced conductive line coupling variation in the IC; and
a computer processor programmed to execute a Monte Carlo simulation of the IC including the device process model and the at least one of the group consisting of the conductive line model and the MPT model, to identify parasitic couplings in the IC.

16. The computer implemented system of claim 15, wherein the conductive line variables include at least one of the group consisting of line thickness deviation, line width deviation and line height deviation, and the MPT variables include at least one of the group consisting of X-axis metal shift and Y-axis metal shift between a photomask and a pattern previously formed on a substrate.

17. A non-transitory machine readable storage medium encoded with computer program code, such that when a computer processor executes the computer program code, the processor performs an integrated circuit (IC) simulation method, comprising
(a) providing a device process model from a non-transitory machine readable storage medium into a programmed computer, the device process model including one or more device variables, each device variable defining a probability distribution of an active-device-level variation of devices in an IC;
(b) providing at least one of the group consisting of a conductive line model and a multi patterning technology (MPT) model from the storage medium to the computer, the conductive line model including one or more conductive line variables, each conductive line variable defining a probability distribution of a conductive-line process-induced variation in the IC, the MPT model including one or more MPT variables, each MPT variable defining a probability distribution of a mask-misalignment-induced conductive line coupling variation in the IC;
(c) performing in the computer a Monte Carlo simulation of the IC including the device process model and the at least one of the group consisting of the conductive line model and the MPT model, to identify parasitic couplings in the IC.

18. The non-transitory machine readable storage medium of claim 17, wherein the conductive line variables include at least one of the group consisting of line thickness deviation, line width deviation and line height deviation, and the MPT variables include at least one of the group consisting of X-axis metal shift and Y-axis metal shift between a photomask and a pattern previously formed on a substrate.

19. The non-transitory machine readable storage medium of claim 17, wherein the Monte Carlo simulation is included in a pre-layout simulation performed before laying out the IC, as part of a design flow for designing the IC, and the method further comprises:
  (i) providing a design of the IC at a schematic level;
  (ii) inserting discrete representations of at least one network of conductive lines into the schematic level design,
  (iii) wherein the pre-layout simulation, including the Monte Carlo simulation, is performed after inserting the representations of the at least one network of conductive lines.

20. The non-transitory machine readable storage medium of claim 17, further comprising providing the probability distribution of the conductive-line process-induced variation and the probability distribution of the mask-misalignment-induced conductive line coupling variation to an RC extraction module of an electronic design automation tool as part of an RC extraction technology file, wherein the Monte Carlo simulation is performed as part of the RC extraction flow for designing the IC.

* * * * *